United States Patent [19]

Yada et al.

[11] Patent Number: 5,087,185
[45] Date of Patent: Feb. 11, 1992

[54] APPARATUS FOR TAKING OFF THERMOPLASTIC SYNTHETIC RESIN SHEET

[75] Inventors: Tooru Yada, Iwata; Hideaki Nakayama; Hiroyuki Kurita, both of Hamamatsu, all of Japan

[73] Assignee: Kyowa Leather Cloth Co., Ltd., Shizuoka, Japan

[21] Appl. No.: 403,941

[22] Filed: Sep. 7, 1989

[30] Foreign Application Priority Data

Sep. 8, 1988 [JP] Japan .................. 63-224973

[51] Int. Cl.⁵ .............................................. B29C 67/20
[52] U.S. Cl. .................................. 425/4 C; 226/100; 264/40.2; 425/140; 425/817 C
[58] Field of Search ............... 425/4 R, 4 C, 817 R, 425/817 C, 140, 66, 403.1; 264/40.2, 40.7, 40.1; 226/100

[56] References Cited

U.S. PATENT DOCUMENTS

| 4,243,363 | 1/1981 | Mulcahy | 425/140 |
| 4,325,897 | 4/1982 | Zerle et al. | 264/40.2 X |
| 4,355,966 | 10/1982 | Sweeney et al. | 264/40.2 X |
| 4,402,656 | 9/1983 | Schott, Jr. | 264/40.2 X |
| 4,650,406 | 3/1987 | Peters | 264/40.2 X |

FOREIGN PATENT DOCUMENTS 48-9955 3/1973 Japan .
1275089 5/1972 United Kingdom .

Primary Examiner—Richard L. Chiesa
Attorney, Agent, or Firm—Oliff & Berridge

[57] ABSTRACT

An apparatus for continuously taking off a thermoplastic synthetic resin sheet foamed by a vertical foaming furnace which has a rail fixedly disposed horizontally, two bodies mounted obliquely at the same angle in a linear symmetrical manner with respect to a vertical line and moving in parallel along the rail, a driver for driving the bodies, two holding roll rows having a plurality of holding rolls disposed in a zigzag manner along the longitudinal direction of the body, a pair of supports respectively wound on the holding rolls, and sensors having optical fiber sensors electrically connected to the driver and provided at each of the upper ends of the bodies. The interval of the two bodies is defined to be narrow at its top and wider toward the lower interval. The degree of the width of the foamed sheet is determined by the angle. The sensor includes two casing halves. One casing half contains a light emitting unit of the optical fiber sensor. The other casing half contains a photodetector of the optical fiber sensor. Both the lateral ends of the foamed sheet are passed between the two casing halves. The optical fiber sensors are so electrically connected to the driver as to turn off the power source of the driver when both the lateral ends of the foamed sheet are detected by the fiber sensors.

16 Claims, 7 Drawing Sheets

APPARATUS FOR TAKING OFF THERMOPLASTIC SYNTHETIC RESIN SHEET

BACKGROUND OF THE INVENTION

1. Field of the Invention

This invention relates to an apparatus for continuously taking off a thermoplastic synthetic resin sheet material foamed by a vertical foaming furnace.

2. Prior Art

A foamed synthetic resin sheet produced by a vertical foaming furnace caused longitudinal wavy wrinkles. The wrinkles occurred when foaming. Accordingly, in order to remove the wrinkles, it is known to laterally orient a foamed sheet.

Japanese Patent Publication No. 48-9955 discloses an apparatus for taking off a polyolefin synthetic resin sheet foamed by a vertical foaming furnace The apparatus comprises a pair of rotary suction belts (made of cloth or rubber belts in which a number of fine holes are perforated) having a number of vent holes, and a vacuum suction device. The rotary suction belts are provided at an interval set by considering a distance corresponding to a rate of lateral expansion of the foamed sheet oppositely in a symmetrical manner. The belts suck air through the vent holes to suck both ends of the foamed sheet in its lateral direction, thereby orienting the sheet.

In the apparatus as described above, the thermoplastic synthetic resin sheet heated and foamed by the vertical foaming furnace is continuously taken off by the suction belts immediately after heating and foaming. In this taking off method, its suction force has a limit so that the holding force of the suction belts for the sheet is weak. Thus, the above method has the following disadvantages.

(1) The sheet material cannot be held to the suction belts by the suction force against the fluctuation of the sheet or the irregular thickness of the sheet due to variations in hot blast stream in the hot blast in the foaming furnace.

(2) When a thin sheet or the sheet having a weak film strength is employed, the sucked portion of the film is broken by its suction force so that the sheet cannot be held. If the suction force is weakened so as to prevent the sheet from breaking, the sheet cannot be held because the suction force cannot hold the sheet due to the weight of the sheet.

(3) When the falling speed of the sheet from the foaming furnace is slow or the taking-off speed of the apparatus is slow, the sheet cannot be held by the belts due to the weight of the sheet similarly to the case of the above paragraph (2).

(4) The sheet is fusion-bonded to the suction belts due to the slight temperature rise of the foaming furnace, and the sheet cannot be exfoliated from the belts. The sheet becomes hard due to the slight temperature fall of the foaming furnace, and the sheet cannot be sucked to the belts.

SUMMARY OF THE INVENTION

Accordingly, it is a main object of this invention to provide an apparatus for positively producing a thermoplastic synthetic resin sheet foamed having a flat surface with uniform thickness to be oriented in a predetermined width without above-described disadvantages.

In order to achieve the above and other objects, there is provided according to one aspect of the present invention an apparatus for continuously taking off a thermoplastic synthetic resin sheet foamed by a vertical foaming furnace comprising: a sensor for detecting positions of both lateral ends of the foamed sheet; and an extending means comprising a pair of supports and a plurality of holding rolls, the pair of supports automatically moving to follow both the lateral end of the foamed thermoplastic synthetic resin sheet material by a signal of said sensor to hold both the ends of the foamed sheet.

According to another aspect of the present invention, there is provided an apparatus for continuously taking off a thermoplastic synthetic resin sheet foamed by a vertical foaming furnace comprising: a rail fixedly disposed horizontally; two bodies mounted obliquely at the same angle in a linear symmetrical manner with respect to a vertical line, and moving in parallel along said rail; a driver for driving said bodies; two holding roll rows, each row having a plurality of holding rolls disposed in a zigzag manner along a longitudinal direction of each body; a pair of supports respectively wound on each holding roll row; and sensors provided at upper ends of said bodies, each sensor having optical fiber sensors electrically connected to said driver.

The two bodies are disposed at both lateral ends of the foamed thermoplastic synthetic resin sheet moving down by its own weight from the vertical foaming furnace. The sensors are respectively attached to the ends of the bodies.

Two bodies are mounted obliquely at the same angle in a linear symmetrical manner with respect to a vertical line. The interval of the two bodies is so defined as to be narrow at the tops thereof and wider toward the bottoms thereof. The extending degree of the foamed sheet is determined by the angle. Extending means are mounted at the opposite side faces of the two bodies. The two bodies are moved in parallel by the signal of the sensor.

The extending means includes a set of opposite two roll rows having a plurality of holding rolls, and a pair of supports wound to each row. The opposite holding rolls of each holding roll rows are disposed in a zigzag manner along the axis of the bodies. A pair of supports are wound to the rows of the plurality of holding rolls disposed in the zigzag manner at both front and rear sides of the foamed sheet. The pair of supports are contacted each other between the plurality of holding rolls, and moved from the top to the bottom of the bodies. Both the lateral ends of the foamed sheet are held by the pair of supports, and positively held between the plurality of holding rolls.

DESCRIPTION OF THE PREFERRED EMBODIMENTS

Figure 1:
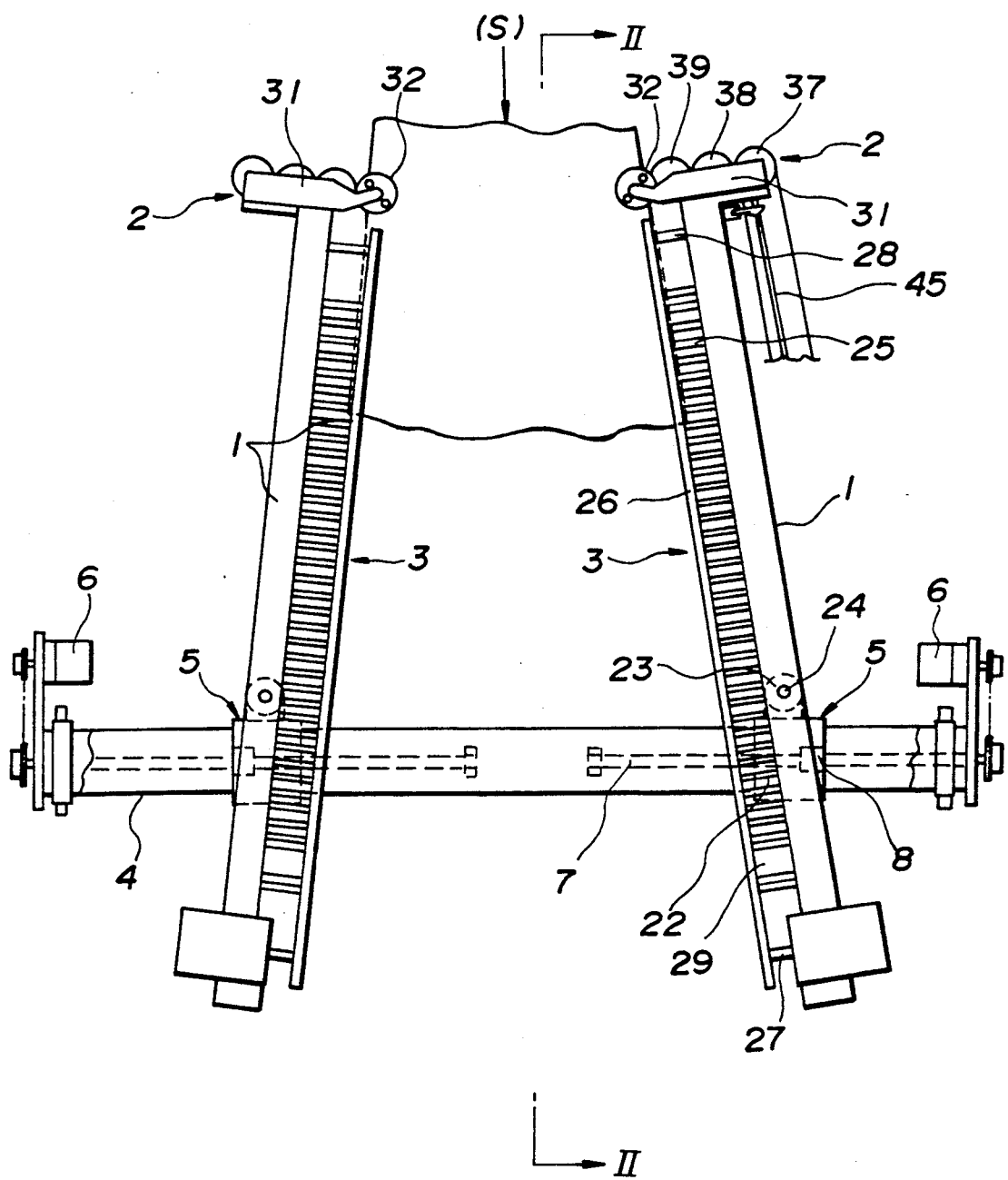
FIG. 1 is a front view of an embodiment of an apparatus for continuously taking off a foamed sheet according to the present invention.

An apparatus for taking off a synthetic resin sheet of the present invention comprises a pair of bodies 1 each having a sensor 2 and an extending means 3.

Two bodies 1 are mounted obliquely at the same angle in a linear symmetrical manner with respect to a vertical line. The interval of the two bodies 1 is so defined as to be narrow at the tops thereof and wider toward the bottoms thereof. The extending degree of the foamed sheet is determined by the angle. The sensors 2 are respectively attached to the top ends of the two bodies 1 and 1. Flanges 21 are formed from both right and left ends of the body 1 toward its inward direction.

The two bodies 1 and 1 are mounted by a moving frame 5 on a rail 4 fixedly disposed horizontally. The moving frame 5 is composed of a sliding frame 22 and a bracket 23. The bracket 23 is rotatably supported by a bolt 24 to the flange 21 of the body 1. The sliding frame 22 is slidably engaged with the rail 4.

The bodies 1 are moved along the rails 4 in parallel by a driver 6 provided on the rail 4. A threaded shaft 7 is provided in the rail 4. The threaded shaft 7 is rotated by the driver 6 and can be rotated at the steady position with respect to the rail 4. A nut 8 to be engaged with the threaded shaft 7 is disposed in the moving frame 5. The nut 8 is clamped to the moving frame 5. The moving frame 5 is not rotated with respect to the rail 4. The moving frame 5 is slidable with respect to the rail 4. When the threaded shaft 7 is rotated by the driver 6, the bodies 1 and 1 can be moved along the rail 4 by the engagement of the threaded shaft 7 with the nut 8. The moving mechanism of the body 1 is not limited to the embodiment shown, and may employ a known moving mechanism.

Figure 2:
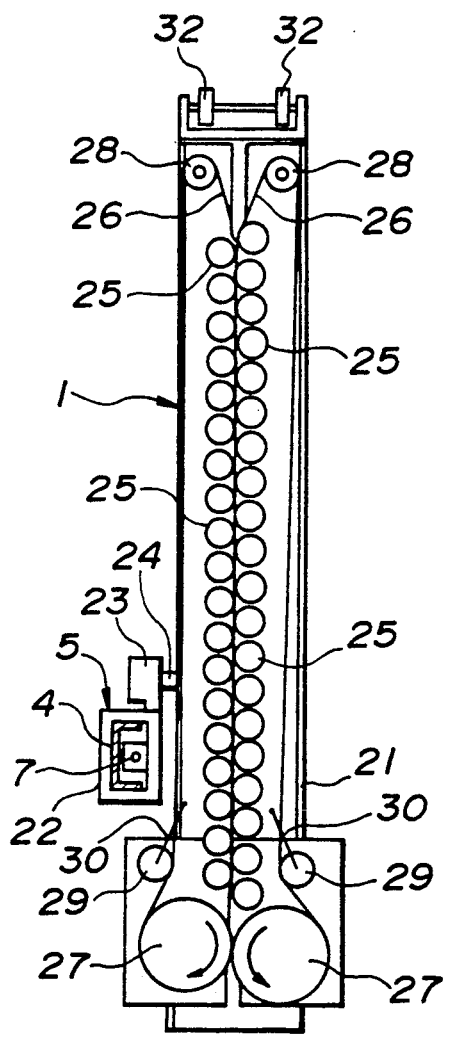
FIG. 2 is a view as seen from arrows with lines II—II in FIG. 1.

The bodies 1 and 1 have extending means 3 on the opposite faces of the two bodies 1 and 1, respectively. The extending means 3 includes two opposite holding roll rows having a plurality of holding rolls 25, and a pair of supports 26 and 26 having a string-like shape. As shown in FIG. 2, the plurality of holding rolls 25 of the two rows are disposed in a zigzag manner along the longitudinal direction of the body 1 so that two rows of holding roll rows are composed along the longitudinal direction of the body 1. The supports 26 and 26 are wound on the roll rows. Lateral ends of the foamed sheet S is interposed to be held between the pair of supports 26 and 26. The body 1 has a driving wheel 27 for driving the support 26 and a guide wheel 28 for guiding the support 26. The supports 26 and 26 are pressurized and contacted each other with the rows of the holding rolls 25, and moved endlessly from the top toward the bottom of the rows of the holding rolls 25 by the driving wheel 27.

The sensors 2 are provided at the upper end of each body 1, respectively. The sensor 2 includes a sensor frame 31. A sensor gear 32 for detecting both lateral ends of the foamed sheet material S is attached to the sensor frame 31. The sensor gear 32 has a casing 33 and optical fiber sensors 34, 35. The casing 33 comprises of casing halves 33a, 33b. Both the lateral ends of the foamed sheet S pass between the casing halves 33a and 33b. Light emitting units 34 of the optical fiber sensors are contained in one casing 33a. Photodetectors 35 of the optical fiber sensors are contained in the other casing half 33b. Windows 36 for passing radiated lights are respectively formed on the casing halves 33a and 33b at which the light emitting unit 34 and the photodetector 35 are opposed. Both the lateral ends of the foamed sheet pass between the casing halves 33a and 33b, and a light beam radiated from the light emitting unit 34 is shielded by both lateral ends of the foamed sheet, thereby detecting both the ends of the foamed sheet. The light emitting unit 34 and the photodetector 35 are electrically connected to the driver 6. The signal from the photodetector 35 is inputted to the driver 6. The light emitting unit 34 and the photodetectors 35 are so connected as to turn OFF the power source of the driver 6 when they detect both the ends of the foamed sheet. A known computer may be connected between the optical fiber sensor and the driver 6, and can process information obtained from the sensor gear 32.

The bodies 1 and 1 are first disposed at an interval wider than the width of the foamed sheet S heated and foamed by a vertical foaming furnace. The bodies 1 and 1 are positioned at a falling position of the foamed sheet S. The foamed sheet S which is still soft immediately after it is foamed is moved down vertically by its own weight to a position lower than the sensor gears 32 and 32. The sensors are switched on, and the driver 6 is switched on. The bodies 1 and 1 are so moved as to approach to each other. The sensor detects that both the lateral ends of the foamed sheet S are inserted between the casing halves 33a and 33b, and inputs a signal to the driver 6. Then, the bodies 1 and 1 are stopped so that the bodies 1, 1 are disposed at suitable positions. The supports 26 and 26 of the extending means 3 start rotating in directions of arrows indicated in FIG. 2.

The foamed sheet S is further moved down, and both the lateral ends of the foamed sheet S are interposed to be held between the two supports 26 and 26. The foamed sheet S is further fed to be held between the plurality of holding rolls 25.

Both the lateral ends of the foamed sheet S are held between the supports 26 and 26, and positively held by the plurality of holding rolls 25 disposed in a zigzag manner. The movement of the supports 26 causes the foamed sheet S to be moved down. Since two bodies 1 are inclined in a linear symmetrical manner with respect to a vertical line, the foamed sheet S is gradually extended laterally outwardly as the sheet S is moved down, thereby obtaining the foamed sheet S having a flat surface and a uniform thickness.

According to the present invention, both the lateral ends of the foamed sheet S are held by the uniform holding force over the entire area between the supports 26 and 26 wound on the plurality of holding rolls 25 disposed in a zigzag manner.

Figure 3:
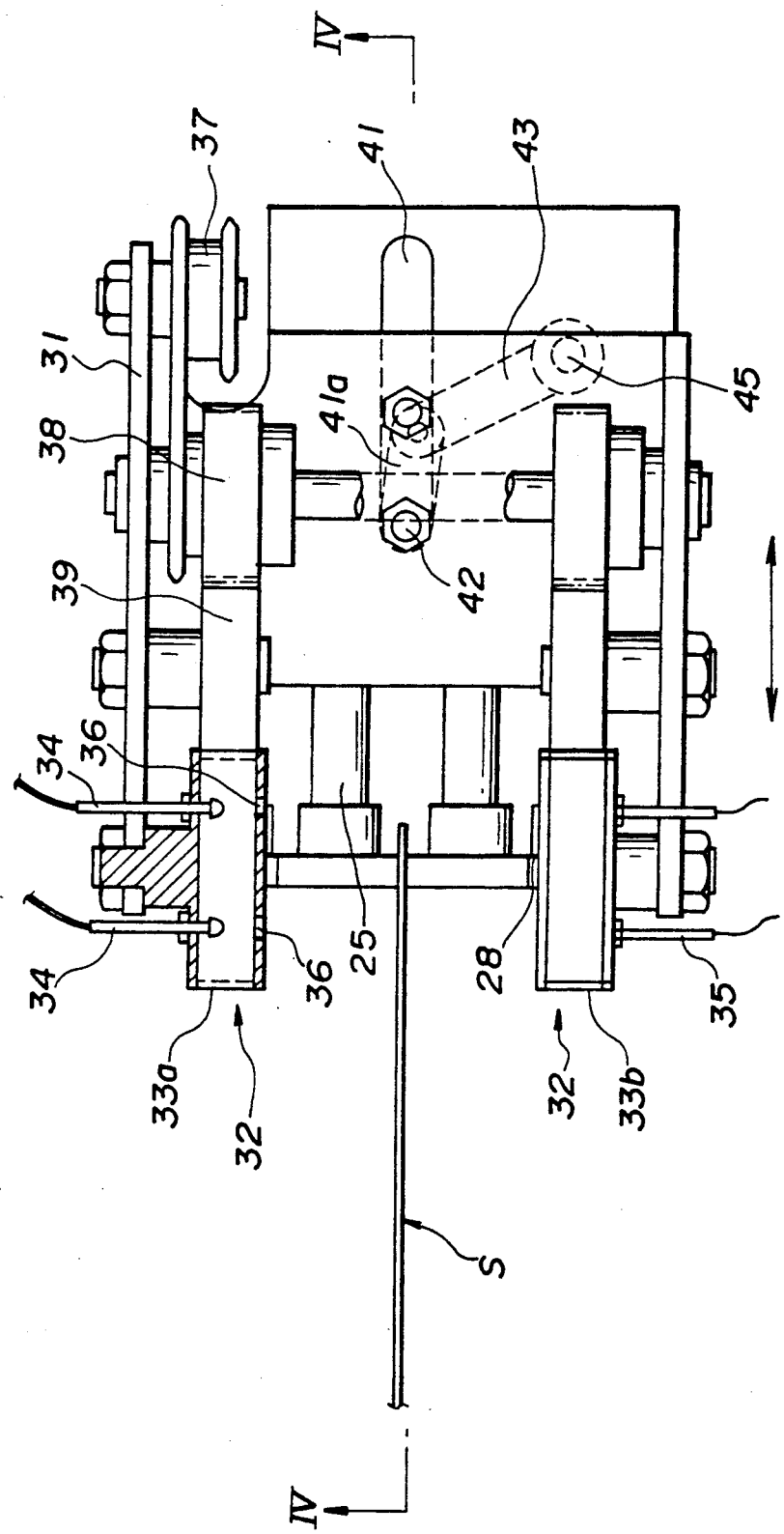
FIG. 3 is a plan view of a sensor gear.
Figure 4:
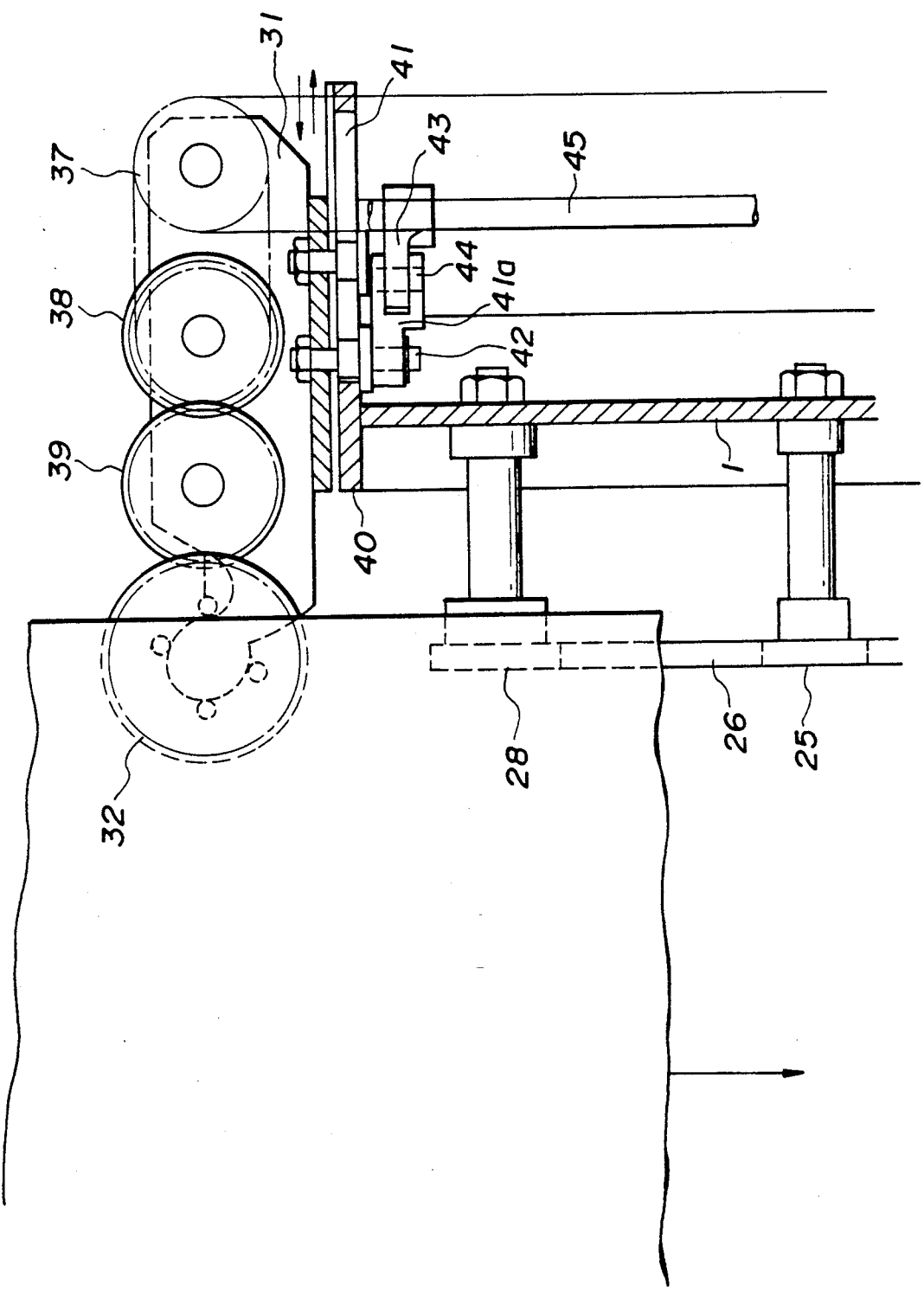
FIG. 4 is a sectional view taken along the line IV—IV of FIG. 3.

Driving gears 37 may be provided at the sensor frame 31 for rotating the casing halves 33a and 33b. The driving gear 37 may be manually rotated, or driving means, such as a motor may be provided. As shown in FIGS. 3 and 4, intermediate gears 38, 39 may be provided between the driving gear 37 and the casing halves 33a, 33b. The casing halves 33a, 33b are rotated by rotating the driving gear 37 to alter the positions of the light emitting units 34 and the photodetectors 35 with respect to the vertical line so that the detecting accuracy of the sensor may be adjusted.

The engaging degree of the supports 26 with the lateral ends of the foamed sheet S may be adjusted by moving the sensor 2 laterally of the foamed sheet S. An upper end plate 40 is formed at the upper end of the body 1. A hole 41 of the direction parallel to the surface of the foamed sheet S is perforated at the upper end plate 40. One end of an arm 41a is disposed below the sensor frame 31 by a bolt 42 penetrated through the hole 41 of the upper end plate 40 of the body 1. The arm 41a is rotatable with respect to the sensor frame 31. A second arm 43 is attached by a bolt 44 to the other end of the arm 41a. The bolt 44 is disposed at one end of the second arm 43. The second arm 43 is rotatable with respect to the arm 41a. A shaft 45 is secured to the other end of the second arm 43. The sensor frame 31 can be moved in a direction of an arrow in FIG. 3 by rotating the shaft 45 manually or by a driving mechanism, such as a motor or the like.

Belt-like articles or chain-like articles may be employed as the supports 26 of the invention. In case of the belt-like articles, glass fiber felt which is impregnated with flexible synthetic resin, such as silicone resin, polyimide resin, fluorine resin, etc., and coated on its surface with fluorocarbon, e.g., polytetrafluoroethylene resin may be used. Synthetic resin having excellent high temperature resistance, less stretchability and excellent wear resistance (polyimide resin or fluorine resin), copolymer thereof, or their mixture which is molded as a sole layer or a laminate in an endless belt may be employed. In case of the chain-like article, roller chains made of metal or the above described synthetic resin or the like which are molded in an endless manner may be used. In this case, the surface of the chain is covered with fluorocarbon, e.g., polytetrafluoroethylene resin or metal-plated. It is necessary that the surface of the above-described belt-like article or chain-like article is treated with adhesive prevention, thereby preventing the foamed sheet S from adhering to the supports 26. Since the belt-like article is rigid against a load, a V-belt type is preferable. The chain-like article is preferably of attachment chain type having a flat surface on its back because of the same reason.

As described above, the foamed sheet S is of extremely soft sheet material of yet soft state when it is inserted to the supports 26. Accordingly, it is preferable to provide means for preventing both the lateral ends of the sheet from collapsing by a support of the supports 26 to damage.

It is also preferable to so adjust the tensions of the supports 26 as to obtain a holding force corresponding to the soft state of the foamed sheet. A tension wheel 29 may be attached to the body 1. The tension wheel 29 is pressurized in contact with the supports 26 by a spring 30. By adjusting the strength of the spring 30, the tension of the support 26 is controlled to suitably adjust the holding force.

Figure 6:
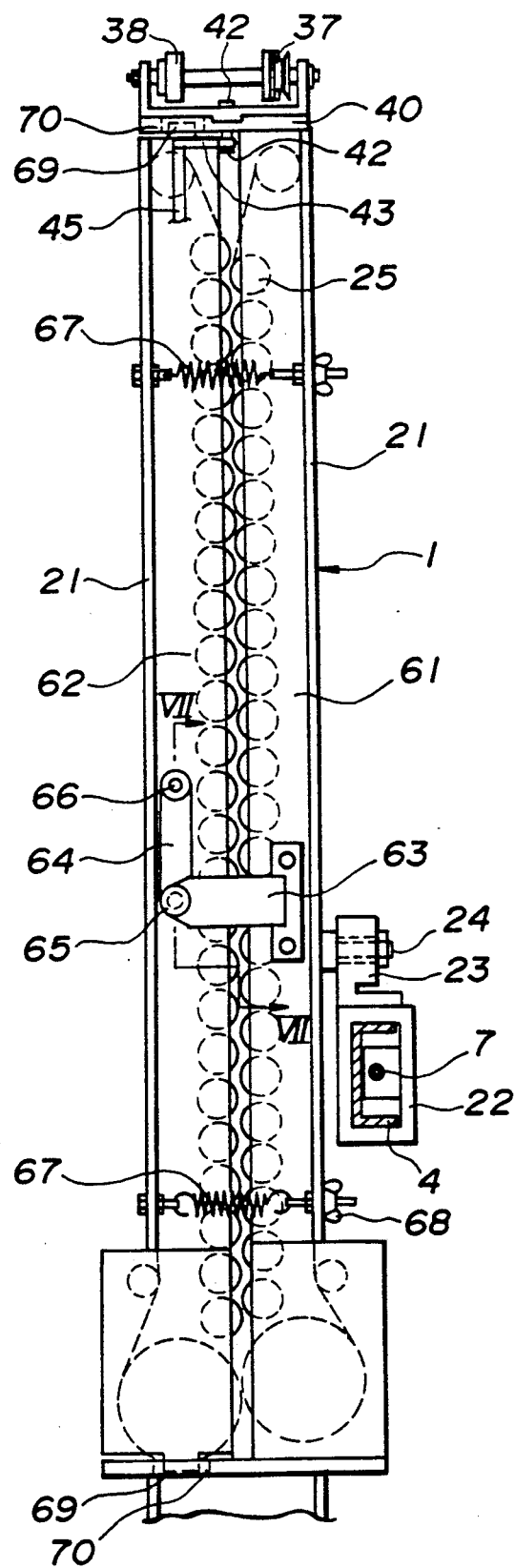
FIG. 6 is a view as seen from arrow with lines VI—VI in FIG. 5.
Figure 7:
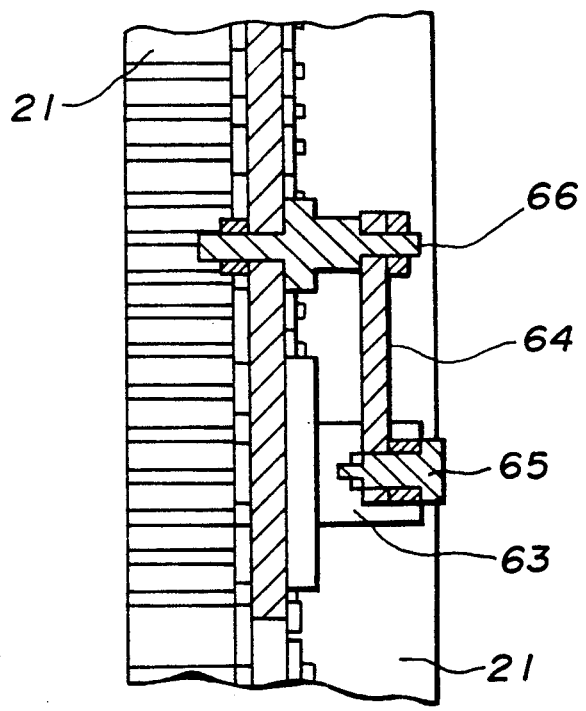
FIG. 7 is a sectional view taken along the line VII—VII in FIG. 6.

As shown in FIG. 6, in order to cope with the thickness of the foamed sheet, the bodies 1 may be formed of two members. In this embodiment, the body 1 comprises a stationary body 61 and a movable body 62. Upper and lower end plates of the stationary body 61 are extended to upper and lower sides of the movable body 62. A first arm 63 is secured to the stationary body 61. A second arm 64 is supported by a shaft 65 to the first arm 63 so that the second arm 64 is rotatable with respect to the first arm 63. The second arm 64 is supported by a shaft 66 to the movable body 62 so that the second arm 64 is rotatable with respect to the movable body 62. The stationary body 61 and the movable body 62 are so energized as to approach to each other by a spring 67. A tensile force of the spring 67 is adjusted by a nut 68. In order to limit an interval between the stationary body 61 and the movable body 62, guide projections 69 are respectively formed on upper and lower end faces of the movable body 62, and guide grooves 70 are formed on the upper and lower end plates of the stationary body 61. Since the moving range of the movable body 62 necessary to correspond to the thickness of the foamed sheet is short, and since a rotating angle of the second arm 64 is small due to the fact that the rotating radius of the second arm 64 is large, the substantially linearly sliding motion of the movable body 62 is conducted by the minimum frictional resistance.

Figure 5:
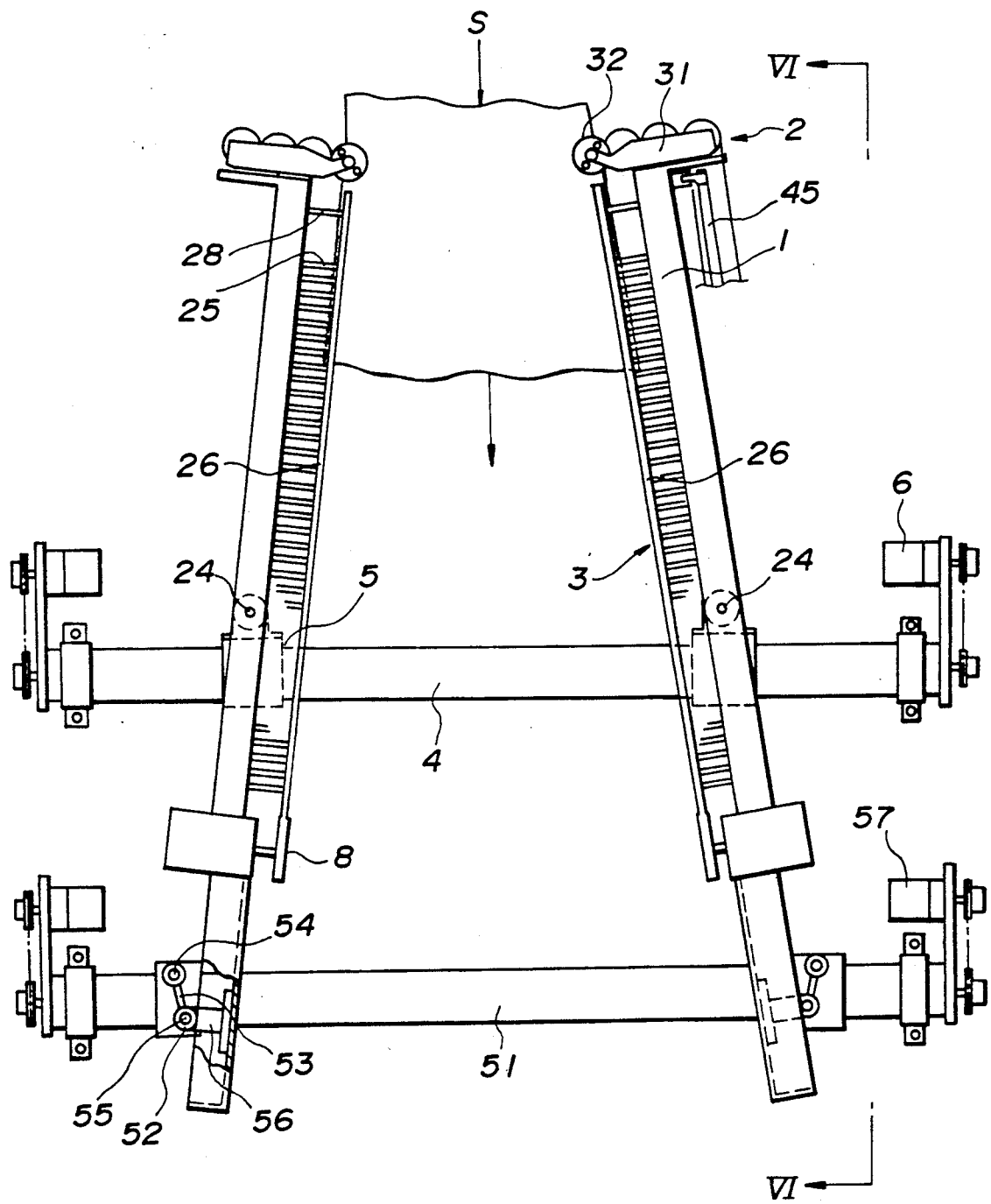
FIG. 5 is a front view of another embodiment of the present invention.

As shown in FIG. 5, a second rail 51 disposed fixedly horizontally may be provided on the bodies 1 and 1. The inclining angle of the bodies 1 and 1 with respect to the vertical line can be adjusted by the second rail 51 so that the extending degree of the foamed sheet S can be hence adjusted. The body 1 is attached by a moving frame 52 to the second rail 51. One end of an arm 53 is supported by a shaft 54 to the moving frame 52. The arm 53 is rotatable with respect to the moving frame 52. The other end of the arm 53 is supported to an arm 56 secured to the body 1 by a shaft 55. Accordingly, the arm 53 is rotatable with respect to the body 1. A driver 57 is provided on the second rail 51. The bodies 1 and 1 may be moved in parallel with respect to the second rail 51 by the same moving mechanism as that provided in the rail 4. Therefore, with the bolt 24 as a fulcrum, the inclining angle, i.e., the extending width of the body frame can be adjusted.

The driving wheel 27 may be moved before the sensor detects both the lateral ends of the foamed sheet.

The sensor gear 32 may be so electrically connected to the driving wheel 27 as to move the driving wheel 27 when the sensor detects both the ends of the foamed sheet. In this case, the signal from the sensor gear is inputted to the driving wheel 27. With this arrangement, when the foamed sheet is held by the sensor gear 32, the driving wheel 27 is automatically moved.

The foamed sheet material applied to the apparatus of the present invention is of a foamed sheet material of thermoplastic resin heated and foamed in a vertical foaming furnace. For example, the apparatus of the present invention may be employed for the foamed sheet of thermoplastic resin sheet produced by polyolefin resin such as crosslinked polyolefin or crosslinked polypropylene, polyvinyl chloride, their mixture, or their copolymer.

According to the present invention as described above, both the lateral ends of the soft foamed sheet of yet soft state immediately after it is foamed in the vertical foaming furnace are detected by the sensors, the body frame is moved by the sensors, and both the ends of the foamed sheet can be oriented to be extended to a predetermined width while they are held by the plurality of holding rolls and the pair of supports mounted on the body frame. Therefore, according to the present invention, it can prevent both the lateral ends of the foamed sheet from damaging or partly exfoliating and obtain the foamed sheet material having uniform thickness with a homogeneous cell structure including a flat surface.

According to the invention, the operations, such as insertion of the foamed sheet, the alteration of the width can be automatically performed by the sensors. Consequently, the operability is improved, its facility cost is reduced, energy-saving is achieved, maintenance cost, noise, and public pollution countermeasure, such as atmosphere pollution can be reduced.

What is claimed is:

1. An apparatus for continuously taking off a thermoplastic resin sheet foamed by a vertical foaming furnace comprising:
   a rail fixedly disposed horizontally;
   two bodies mounted obliquely at the same angle in a linear symmetrical manner with respect to a vertical line, and moving in parallel along said rail;
   a driver for driving said bodies;
   two holding roll rows, each row having a plurality of holding rolls disposed in a zigzag manner along a longitudinal direction of each body;
   a pair of supports respectively wound on each holding roll row; and
   sensors for detecting positions of both lateral ends of the foamed sheet provided at upper ends of said bodies, each sensor having optical fiber sensors electrically connected to said driver.

2. The apparatus according to claim 1, wherein
   an interval of said two bodies is narrow at the tops thereof and wider toward bottoms thereof.

3. The apparatus according to claim 1, wherein
   said bodies are attached to said rail by a moving frame, and
   said moving frame is rotatably supported to said bodies by a bolt.

4. The apparatus according to claim 1, wherein
   each of said sensors includes casings,
   one casing contains a light emitting unit of said optical fiber sensor,
   the other casing contains a photodetector of said optical fiber sensor, and
   the lateral ends of said foamed sheet are passed between two said casings.

5. The apparatus according to claim 4, wherein
   each of said sensors includes a sensor frame, and driving means for rotating said two casings is provided in said sensor frame.

6. The apparatus according to claim 1, wherein
   said optical fiber sensors are so electrically connected said driver as to turn off the power source of said driver when the lateral ends of said foamed sheet are detected by said fiber sensors.

7. The apparatus according to claim 1, wherein
   each of said sensors includes a sensor frame,
   each of said bodies includes an upper end plate at an upper end thereof,
   a hole is perforated at said upper end plate in a direction parallel t a surface of said foamed sheet,
   one end of an arm is attached to a lower face of said sensor frame by a bolt penetrated through said hole, so that the arm is rotatable with respect to said sensor frame,
   one end of a second arm is attached to the other end of said arm by a bolt so that the second arm is rotatable with respect to said arm, and
   the other end of said second arm is provided with driving means,.

8. The apparatus according to claim 1, wherein
   each of said supports is a belt formed by impregnating glass fiber felt with synthetic resin selected from a group consisting of silicon resin, polyimide resin and fluorine resin, and coating a surface thereof with fluoro-carbon resin.

9. The apparatus according to claim 1, wherein
   each of said supports is a belt formed of a single layer or a laminate of polyimide resin and/or fluorine resin, copolymer thereof or mixture thereof.

10. The apparatus according to claim 1, wherein
    each of one of a said supports is a chain made of metal, polyimide resin or fluorine resin.

11. The apparatus according to claim 10, wherein
    a surface of said chain is coated with one of a fluorocarbon resin or a metal.

12. The apparatus according to claim 1, wherein
    a tension wheel for pressurizing said supports is provided in each of said bodies, and
    said supports are pressurized in contact with the tension wheel by a spring.

13. The apparatus according to claim 1, wherein
    each of said bodies comprises a stationary body and a movable body,
    said stationary body and said movable body are energized in a direction for approaching to each other by a spring, and
    a nut for adjusting a tensile force of said spring is provided.

14. The apparatus according to claim 13, wherein
    said movable body is provided at upper and lower end faces thereof with guide projections,
    said stationary body includes upper and lower end plates, and
    said upper and lower end plates are provided with guide slots.

15. The apparatus according to claim 1, further comprising:
    a second rail fixedly disposed horizontally, and
    a driver provided on said second rail.

16. The apparatus according to claim 15, wherein
    each of said bodies is attached to said second rail by a moving frame, respectively,
    said moving frame is supported with one end of an arm by a shaft, and
    said arm is supported by a shaft at the other end thereof with one end of the second arm secured to said body.